US012725280B2

(12) United States Patent
Bao et al.

(10) Patent No.: US 12,725,280 B2
(45) Date of Patent: Sep. 1, 2026

(54) OBJECT DETECTION BASED ON MOTION-GUIDED TOKENS

(71) Applicants: TOYOTA RESEARCH INSTITUTE, INC., Los Altos, CA (US); CARNEGIE MELLON UNIVERSITY, Pittsburgh, PA (US); THE BOARD OF TRUSTEES OF THE UNIVERSITY OF ILLINOIS, Urbana, IL (US)

(72) Inventors: Zhipeng Bao, Pittsburgh, PA (US); Pavel Tokmakov, Santa Monica, CA (US); Yuxiong Wang, Champaign, IL (US); Adrien David Gaidon, San Jose, CA (US); Martial Hebert, Pittsburgh, PA (US)

(73) Assignees: TOYOTA RESEARCH INSTITUTE, INC.; TOYOTA JIDOSHA KABUSHIKI KAISHA, Aichi-Ken (JP); CARNEGIE MELLON UNIVERSITY; THE BOARD OF TRUSTEES OF THE UNIVERSITY OF ILLINOIS ( * ) Notice: Subject to any disclaimer, the term of this patent is extended or adjusted under 35 U.S.C. 154(b) by 318 days.

(21) Appl. No.: 18/394,746

(22) Filed: Dec. 22, 2023

(65) Prior Publication Data

US 2024/0296571 A1 Sep. 5, 2024

Related U.S. Application Data

(60) Provisional application No. 63/449,285, filed on Mar. 1, 2023.

(51) Int. Cl.

*G06T 7/246* (2017.01)
*G06T 7/215* (2017.01)
*G06V 20/58* (2022.01)

(52) U.S. Cl.

CPC .... *G06T 7/248* (2017.01); *G06T 2207/20081* (2013.01); *G06T 2207/20084* (2013.01); *G06V 20/58* (2022.01)

(58) Field of Classification Search

CPC ........... G06T 7/248; G06T 2207/20081; G06T 2207/20084; G06T 2207/30252; G06T 7/215; G06V 20/58

See application file for complete search history.

(56) References Cited

U.S. PATENT DOCUMENTS

2019/0162842 A1* 5/2019 Niesen .................. G01S 13/867
2020/0226769 A1* 7/2020 Das ......................... G06T 7/254
(Continued)

FOREIGN PATENT DOCUMENTS

CN 111080671 A * 4/2020 ............... G06N 3/08
CN 111339863 A 6/2020
(Continued)

OTHER PUBLICATIONS

Kipf, Thomas, et al. "Conditional object-centric learning from video." Â arXiv preprint arXiv:2111.12594Â (2021) (Year: 2021).*

*Primary Examiner* — Amandeep Saini
*Assistant Examiner* — Andrew S Budisalich
(74) *Attorney, Agent, or Firm* — Seyfarth Shaw LLP

(57) ABSTRACT

A method for learning a representation of a sequence of frames includes encoding, via an encoder network, the sequence of frames to obtain a set of feature maps and extracting, a motion-guided slot learning mechanism, mid-level features from the set of feature maps. The method further includes quantizing the mid-level features via a vector quantization process to obtain a set of tokens, and decoding, via a decoder network, the tokens to obtain a reconstructed sequence of frames. The method still further (Continued)

includes optimizing a combination of a reconstruction loss and a motion loss to train the encoder and decoder networks.

20 Claims, 6 Drawing Sheets

(56) References Cited

U.S. PATENT DOCUMENTS

| | | | | |
|---|---|---|---|---|
| 2021/0374950 | A1* | 12/2021 | Gao | G06N 3/09 |
| 2023/0419551 | A1* | 12/2023 | Harikumar | G06T 9/008 |
| 2024/0104934 | A1* | 3/2024 | Pronovost | G06V 10/774 |
| 2024/0169479 | A1* | 5/2024 | Wang | G06T 3/4053 |

FOREIGN PATENT DOCUMENTS

| | | | |
|---|---|---|---|
| CN | 113393491 | A | 9/2021 |
| CN | 113486924 | A | 10/2021 |
| CN | 115018067 | A | 9/2022 |
| DE | 102021129825 | A1 | 5/2022 |
| WO | 2021150724 | A1 | 7/2021 |

* cited by examiner

OBJECT DETECTION BASED ON MOTION-GUIDED TOKENS

CROSS-REFERENCE TO RELATED APPLICATION

The present application claims the benefit of U.S. Provisional Patent Application No. 63/449,285 on Mar. 1, 2023, and titled "OBJECT DETECTION BASED ON MOTION-GUIDED TOKENS," the disclosure of which is expressly incorporated by reference in its entirety.

BACKGROUND

Field

Certain aspects of the present disclosure generally relate to object segmentation, and more specifically to systems and methods for detecting objects based on motion-guided tokens.

Background

Agents (e.g., vehicles, robots, etc.) rely on machine vision for detecting objects in an environment. In some cases, an object segmentation system (e.g., object discovery system or instance segmentation system) may be used by an agent to separate objects from a background, such that the agent may identify and locate objects in its surroundings. The agent, such as an autonomous agent, may perform one or more tasks, such as navigating through an environment, in accordance with the objects detected by the object segmentation system. Conventional systems may be limited to clustering low-level cues. These low-level clues may be handcrafted (e.g., color and/or texture) or learned from an auto-encoder. Such conventional object segmentation systems may fail to accurately identify and separate objects from the background, as these conventional object segmentation systems may not capture the complex visual relationships and contextual information that may be specified for object or instance segmentation (hereinafter used interchangeably).

SUMMARY

In one aspect of the present disclosure, a method for learning a representation of a sequence of frames includes encoding, via an encoder network, the sequence of frames to obtain a set of feature maps. The method further includes extracting, a motion-guided slot learning mechanism, mid-level features from the set of feature maps. The method also includes quantizing the mid-level features via a vector quantization process to obtain a set of tokens. The method further includes decoding, via a decoder network, the tokens to obtain a reconstructed sequence of frames. The method still further includes optimizing a combination of a reconstruction loss and a motion loss to train the encoder and decoder networks.

Another aspect of the present disclosure is directed to an apparatus including means for encoding, via an encoder network, the sequence of frames to obtain a set of feature maps. The apparatus further includes means for extracting, a motion-guided slot learning mechanism, mid-level features from the set of feature maps. The apparatus also includes means for quantizing the mid-level features via a vector quantization process to obtain a set of tokens. The apparatus further includes means for decoding, via a decoder network, the tokens to obtain a reconstructed sequence of frames. The apparatus still further includes means for optimizing a combination of a reconstruction loss and a motion loss to train the encoder and decoder networks.

In another aspect of the present disclosure, a non-transitory computer-readable medium with non-transitory program code recorded thereon is disclosed. The program code is executed by a processor and includes program code to encode, via an encoder network, the sequence of frames to obtain a set of feature maps. The program code includes program code to extract, a motion-guided slot learning mechanism, mid-level features from the set of feature maps. The program code also includes program code to quantize the mid-level features via a vector quantization process to obtain a set of tokens. The program code further includes program code to decode, via a decoder network, the tokens to obtain a reconstructed sequence of frames. The program code still further includes program code to optimize a combination of a reconstruction loss and a motion loss to train the encoder and decoder networks.

Another aspect of the present disclosure is directed to an apparatus having a processor, and a memory coupled with the processor and storing instructions operable, when executed by the processor, to cause the apparatus to encode, via an encoder network, the sequence of frames to obtain a set of feature maps. Execution of the instructions also cause the apparatus to extract, a motion-guided slot learning mechanism, mid-level features from the set of feature maps. Execution of the instructions further cause the apparatus to quantize the mid-level features via a vector quantization process to obtain a set of tokens. Execution of the instructions further cause the apparatus to decode, via a decoder network, the tokens to obtain a reconstructed sequence of frames. Execution of the instructions still further cause the apparatus to optimize a combination of a reconstruction loss and a motion loss to train the encoder and decoder networks.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
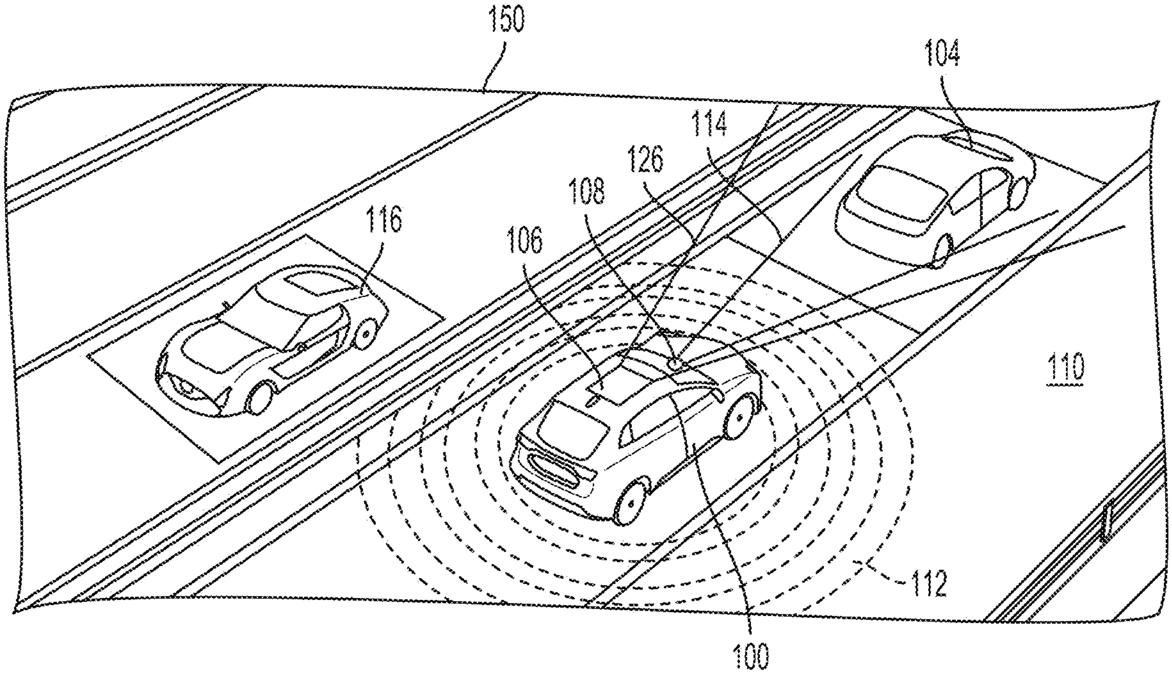
FIG. 1A is a diagram illustrating an example of a vehicle in an environment, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

As discussed, agents (e.g., vehicles, robots, etc.) rely on machine vision for detecting objects in an environment. In some cases, an object segmentation system (e.g., object discovery system or instance segmentation system) may be used by an agent to separate objects from a background, such that the agent may identify and locate objects in its surroundings. The agent, such as an autonomous agent, may perform one or more tasks, such as navigating through an environment, in accordance with the objects detected by the object segmentation system.

Conventional systems may be limited to clustering low-level cues. Low-level cues may be basic visual features that can be extracted from an image or a sequence of images (e.g., a video). These basic visual features may be simple, local, and often directly observable in the image. Examples of low-level cues include color, texture, edges, and corners. These low-level clues may be handcrafted (e.g., color and/or texture) or learned from an auto-encoder. Low-level cues may be used as the starting point for more advanced processing, such as object segmentation and recognition. For example, in object segmentation, low-level cues can be used to identify regions of an image or video that may contain an object of interest.

However, low-level cues alone may not be sufficient for accurate and robust object segmentation, because low-level cues may not capture the complex visual relationships and contextual information specified for accurate and robust segmentation detection. Therefore, conventional object segmentation systems that are limited to using low-level cues may fail to accurately identify and separate objects from the background. For example, these conventional object segmentation systems may not capture complex visual relationships and contextual information.

Various aspects of the present disclosure are directed to training an object segmentation system, in an unsupervised manner, to learn object-centric representations. In some examples, the object segmentation system learns object-centric representations by leveraging motion-guidance and mid-level feature tokenization. By using motion-guidance and mid-level feature tokenization, aspects of the present disclosure enable the emergence of interpretable object-specific mid-level features, which are features that capture higher-level semantic information about the objects in the scene.

In some examples, the object segmentation system includes an auto-encoder representation learning framework with two key components: motion-guidance and mid-level feature tokenization. Motion-guidance refers to the use of motion cues to guide the learning process, allowing the object segmentation system to identify and track objects in the scene without explicit labeling. Mid-level feature tokenization refers to the use of vector quantization to extract and represent object-specific mid-level features, which are more abstract and semantically meaningful than low-level features. Such examples leverage the synergy between motion and tokenization, improving upon the conventional object segmentation systems that are trained on synthetic and/or real datasets.

Particular aspects of the subject matter described in this disclosure may be implemented to realize one or more of the following potential advantages. In some examples, the described techniques enable the object segmentation system to learn object-centric representations without explicit labeling while also improving interpretability and reducing memory use.

The MoTok frameworks may be integrated with an agent, such as a vehicle or robotic device. Aspects of the present disclosure are not limited to a vehicle or robotic device. Aspects of the present disclosure also contemplate other types of agents. Additionally, the agent may operate in an autonomous mode, a manual mode, or a semi-autonomous mode. In the manual mode, a human driver manually operates (e.g., controls) the agent. In the autonomous mode, an agent control system operates the agent without human intervention. In the semi-autonomous mode, the human may operate the agent, and the agent control system may override or assist the human. For example, the agent control system may override the human to prevent a collision or to obey one or more traffic rules.

FIG. 1A is a diagram illustrating an example of a vehicle 100 in an environment 150, in accordance with various aspects of the present disclosure. In the example of FIG. 1A, the vehicle 100 may be an autonomous vehicle, a semi-autonomous vehicle, or a non-autonomous vehicle. As shown in FIG. 1A, the vehicle 100 may be traveling on a road 110. A first vehicle 104 may be ahead of the vehicle 100 and a second vehicle 116 may be adjacent to the ego vehicle 100. In this example, the vehicle 100 may include a 2D camera 108, such as a 2D red-green-blue (RGB) camera, and a LIDAR sensor 106. Other sensors, such as RADAR and/or ultrasound, are also contemplated. Additionally, or alternatively, although not shown in FIG. 1A, the vehicle 100 may include one or more additional sensors, such as a camera, a RADAR sensor, and/or a LIDAR sensor, integrated with the vehicle in one or more locations, such as within one or more storage locations (e.g., a trunk). Additionally, or alternatively, although not shown in FIG. 1A, the vehicle 100 may include one or more force measuring sensors.

In one configuration, the 2D camera 108 captures a 2D image that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream 124 may include a 3D cloud point of objects in a second field of view, such as a forward facing field of view 126.

The 2D image captured by the 2D camera includes a 2D image of the first vehicle 104, as the first vehicle 104 is in the 2D camera's 108 field of view 114. As is known to those of skill in the art, a LIDAR sensor 106 uses laser light to sense the shape, size, and position of objects in the environment 150. The LIDAR sensor 106 may vertically and horizontally scan the environment 150. In the current example, the artificial neural network (e.g., autonomous driving system) of the vehicle 100 may extract height and/or depth features from the first output stream. In some examples, an autonomous driving system of the vehicle 100 may also extract height and/or depth features from the second output stream.

The information obtained from the sensors 106, 108 may be used to evaluate a driving environment. Additionally, or alternatively, information obtained from one or more sensors that monitor objects within the vehicle 100 and/or forces generated by the vehicle 100 may be used to generate notifications when an object may be damaged based on actual, or potential, movement.

Figure 1B:
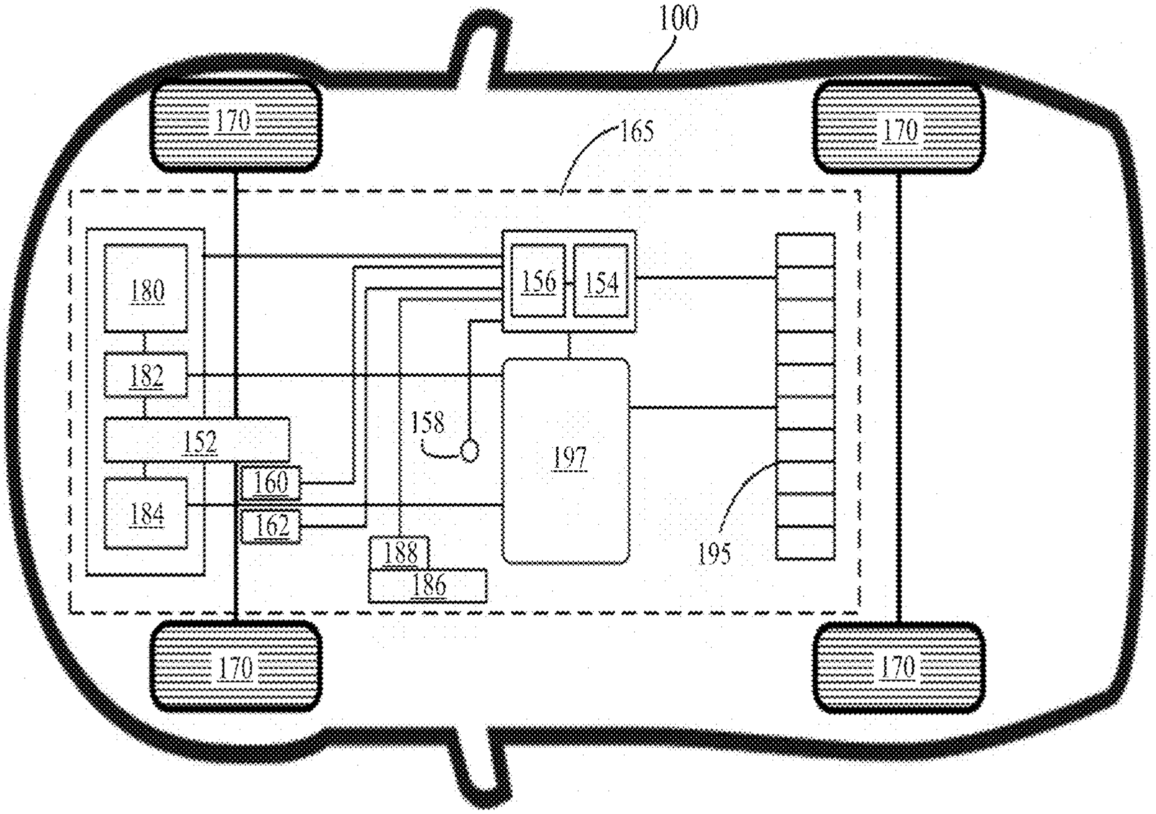
FIG. 1B is a diagram illustrating an example of the vehicle, in accordance with various aspects of the present disclosure.

FIG. 1B is a diagram illustrating an example the vehicle 100, in accordance with various aspects of the present disclosure. It should be understood that various aspects of the present disclosure may be applicable to/used in various vehicles (internal combustion engine (ICE) vehicles, fully electric vehicles (EVs), etc.) that are fully or partially autonomously controlled/operated, and as noted above, even in non-vehicular contexts, such as, e.g., shipping container packing.

The vehicle 100 may include drive force unit 165 and wheels 170. The drive force unit 165 may include an engine 180, motor generators (MGs) 182 and 184, a battery 195, an inverter 197, a brake pedal 186, a brake pedal sensor 188, a transmission 152, a memory 154, an electronic control unit (ECU) 156, a shifter 158, a speed sensor 160, and an accelerometer 162.

The engine 180 primarily drives the wheels 170. The engine 180 can be an ICE that combusts fuel, such as gasoline, ethanol, diesel, biofuel, or other types of fuels which are suitable for combustion. The torque output by the engine 180 is received by the transmission 152. MGs 182 and 184 can also output torque to the transmission 152. The engine 180 and MGs 182 and 184 may be coupled through a planetary gear (not shown in FIG. 1B). The transmission 152 delivers an applied torque to one or more of the wheels 170. The torque output by engine 180 does not directly translate into the applied torque to the one or more wheels 170.

MGs 182 and 184 can serve as motors which output torque in a drive mode, and can serve as generators to recharge the battery 195 in a regeneration mode. The electric power delivered from or to MGs 182 and 184 passes through the inverter 197 to the battery 195. The brake pedal sensor 188 can detect pressure applied to brake pedal 186, which may further affect the applied torque to wheels 170. The speed sensor 160 is connected to an output shaft of transmission 152 to detect a speed input which is converted into a vehicle speed by ECU 156. The accelerometer 162 is connected to the body of vehicle 100 to detect the actual deceleration of vehicle 100, which corresponds to a deceleration torque.

The transmission 152 may be a transmission suitable for any vehicle. For example, transmission 152 can be an electronically controlled continuously variable transmission (ECVT), which is coupled to engine 180 as well as to MGs 91 and 92. Transmission 20 can deliver torque output from a combination of engine 180 and MGs 91 and 92. The ECU 156 controls the transmission 152, utilizing data stored in memory 154 to determine the applied torque delivered to the wheels 170. For example, ECU 156 may determine that at a certain vehicle speed, engine 180 should provide a fraction of the applied torque to the wheels 170 while one or both of the MGs 182 and 184 provide most of the applied torque. The ECU 156 and transmission 152 can control an engine speed (NE) of engine 180 independently of the vehicle speed (V).

The ECU 156 may include circuitry to control the above aspects of vehicle operation. Additionally, the ECU 156 may include, for example, a microcomputer that includes a one or more processing units (e.g., microprocessors), memory storage (e.g., RAM, ROM, etc.), and I/O devices. The ECU 156 may execute instructions stored in memory to control one or more electrical systems or subsystems in the vehicle. Furthermore, the ECU 156 can include one or more electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

The MGs 182 and 184 each may be a permanent magnet type synchronous motor including for example, a rotor with a permanent magnet embedded therein. The MGs 182 and 184 may each be driven by an inverter controlled by a control signal from ECU 156 so as to convert direct current (DC) power from the battery 195 to alternating current (AC) power, and supply the AC power to the MGs 182 and 184. In some examples, a first MG 182 may be driven by electric power generated by a second MG 184. It should be understood that in embodiments where MGs 182 and 184 are DC motors, no inverter is required. The inverter, in conjunction with a converter assembly may also accept power from one or more of the MGs 182 and 184 (e.g., during engine charging), convert this power from AC back to DC, and use this power to charge battery 195 (hence the name, motor generator). The ECU 156 may control the inverter, adjust driving current supplied to the first MG 182, and adjust the current received from the second MG 184 during regenerative coasting and braking.

The battery 195 may be implemented as one or more batteries or other power storage devices including, for example, lead-acid batteries, lithium ion, and nickel batteries, capacitive storage devices, and so on. The battery 195 may also be charged by one or more of the MGs 182 and 184, such as, for example, by regenerative braking or by coasting during which one or more of the MGs 182 and 184 operates as generator. Alternatively (or additionally, the battery 195 can be charged by the first MG 182, for example, when vehicle 100 is in idle (not moving/not in drive).

Further still, the battery 195 may be charged by a battery charger (not shown) that receives energy from engine 180. The battery charger may be switched or otherwise controlled to engage/disengage it with battery 195. For example, an alternator or generator may be coupled directly or indirectly to a drive shaft of engine 180 to generate an electrical current as a result of the operation of engine 180. Still other embodiments contemplate the use of one or more additional motor generators to power the rear wheels of the vehicle 100 (e.g., in vehicles equipped with 4-Wheel Drive), or using two rear motor generators, each powering a rear wheel.

The battery 195 may also power other electrical or electronic systems in the vehicle 100. In some examples, the battery 195 can include, for example, one or more batteries, capacitive storage units, or other storage reservoirs suitable for storing electrical energy that can be used to power one or both of the MGs 182 and 184. When the battery 195 is implemented using one or more batteries, the batteries can include, for example, nickel metal hydride batteries, lithium ion batteries, lead acid batteries, nickel cadmium batteries, lithium ion polymer batteries, and other types of batteries.

Figure 2:
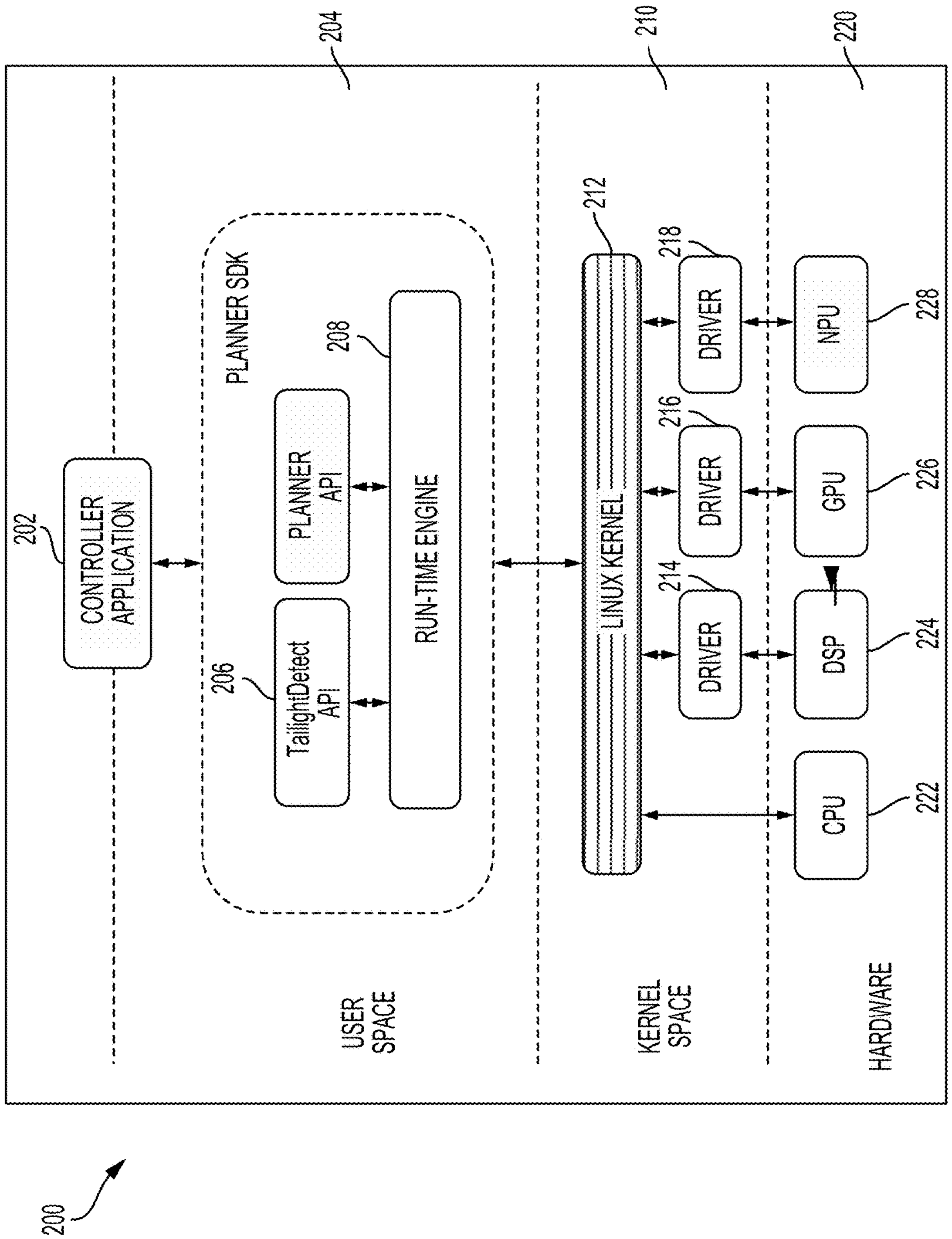
FIG. 2 is a block diagram illustrating a software architecture that may modularize artificial intelligence (AI) functions for planning and control of an agent, in accordance with various aspects of the present disclosure.

FIG. 2 is a block diagram illustrating a software architecture 200 that may modularize artificial intelligence (AI) functions for planning and control of an autonomous agent, according to aspects of the present disclosure. Using the architecture, a controller application 202 may be designed such that it may cause various processing blocks of a system-on-chip (SOC) 220 (for example a central processing unit (CPU) 222, a digital signal processor (DSP) 224, a graphics processing unit (GPU) 226 and/or an network processing unit (NPU) 228) to perform supporting computations during run-time operation of the controller application 202.

The controller application 202 may be configured to call functions defined in a user space 204 that may, for example, provide for taillight recognition of ado vehicles. The controller application 202 may make a request to compile program code associated with a library defined in a taillight prediction application programming interface (API) 206 to perform taillight recognition of an ado vehicle. This request may ultimately rely on the output of a convolutional neural network configured to focus on portions of the sequence of images critical to vehicle taillight recognition.

A run-time engine 208, which may be compiled code of a runtime framework, may be further accessible to the controller application 202. The controller application 202 may cause the run-time engine 208, for example, to take actions for controlling the autonomous agent. When an ado vehicle is detected within a predetermined distance of the autonomous agent, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
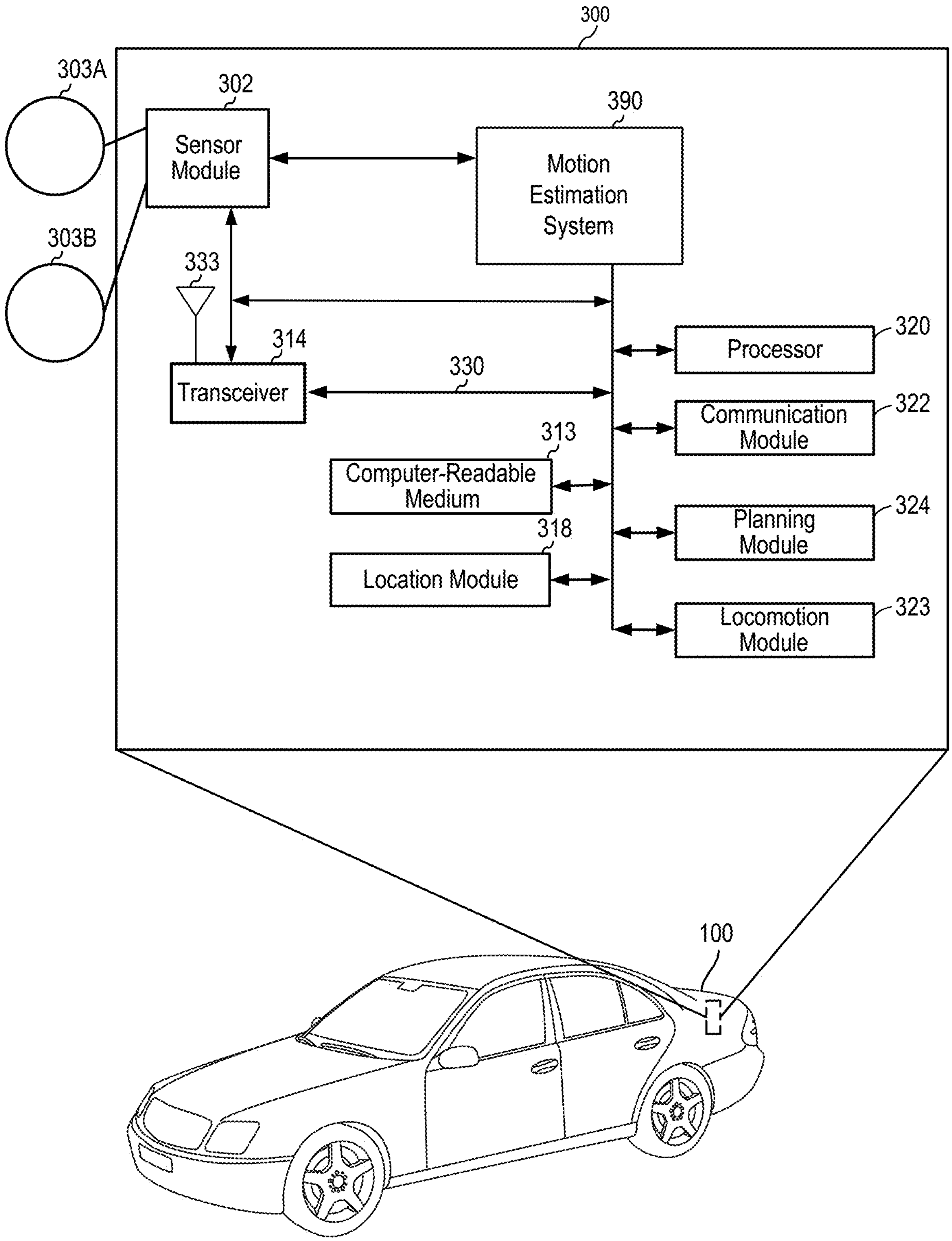
FIG. 3 is a diagram illustrating an example of a hardware implementation for a vehicle control system, in accordance with various aspects of the present disclosure.

FIG. 3 is a diagram illustrating an example of a hardware implementation for a vehicle control system 300, according to aspects of the present disclosure. The vehicle control system 300 may be a component of a vehicle, a robotic device, or other device. For example, as shown in FIG. 3, the vehicle control system 300 is a component of a vehicle 100. Aspects of the present disclosure are not limited to the vehicle control system 300 being a component of the vehicle 100, as other devices, such as a bus, boat, drone, or robot, are also contemplated for using the vehicle control system 300. In the example of FIG. 3, the vehicle system may include a motion estimation system 390. In some examples, motion estimation system 390 is configured to perform operations, including operations of the process 500 described with reference to FIG. 5.

The vehicle control system 300 may be implemented with a bus architecture, represented generally by a bus 330. The bus 330 may include any number of interconnecting buses and bridges depending on the specific application of the vehicle control system 300 and the overall design constraints. The bus 330 links together various circuits including one or more processors and/or hardware modules, represented by a processor 320, a communication module 322, a location module 318, a sensor module 302, a locomotion module 323, a planning module 324, and a computer-readable medium 313. The bus 330 may also link various other circuits such as timing sources, peripherals, voltage regulators, and power management circuits, which are well known in the art, and therefore, will not be described any further.

The vehicle control system 300 includes a transceiver 314 coupled to the processor 320, the sensor module 302, the communication module 322, the location module 318, the locomotion module 323, the planning module 324, and the computer-readable medium 313. The transceiver 314 is coupled to an antenna 333. The transceiver 314 communicates with various other devices over a transmission medium. For example, the transceiver 314 may receive commands via transmissions from a user or a remote device.

In one or more arrangements, one or more of the modules 302, 313, 314, 318, 320, 322, 323, 324, 390, can include artificial or computational intelligence elements, such as, neural network, fuzzy logic or other machine learning algorithms. Further, in one or more arrangements, one or more of the modules 302, 313, 314, 318, 320, 322, 323, 324, 390 can be distributed among multiple modules 302, 313, 314, 318, 320, 322, 323, 324, 390 described herein. In one or more arrangements, two or more of the modules 302, 313, 314, 318, 320, 322, 323, 324, 390 of the vehicle control system 300 can be combined into a single module.

The vehicle control system 300 includes the processor 320 coupled to the computer-readable medium 313. The processor 320 performs processing, including the execution of software stored on the computer-readable medium 313 providing functionality according to the disclosure. The software, when executed by the processor 320, causes the vehicle control system 300 to perform the various functions described for a particular device, such as the vehicle 100, or any of the modules 302, 313, 314, 318, 320, 322, 323, 324, 390. The computer-readable medium 313 may also be used for storing data that is manipulated by the processor 320 when executing the software. In some examples, the computer-readable medium 313 may function as a memory unit for the vehicle control system 300. In such examples, the computer-readable medium 313 may be any type of memory, such as RAM, SRAM, DRAM, or another type of memory. Additionally, or alternatively, the vehicle control system 300 may include another memory unit (not shown in FIG. 3) to store data that is used by one or more modules 302, 313, 314, 318, 320, 322, 323, 324, 390 associated with the vehicle control system 300.

The sensor module 302 may be used to obtain measurements via different sensors, such as a first sensor 303A and a second sensor 303B. The first sensor 303A and/or the second sensor 303B may be a vision sensor, such as a stereoscopic camera or a red-green-blue (RGB) camera, for capturing 2D images. In some examples, one or both of the first sensor 303A or the second sensor 303B may be used to identify an intersection, a crosswalk, or another stopping location. Additionally, or alternatively, one or both of the first sensor 303A or the second sensor 303B may identify objects within a range of the vehicle 100. In some examples, one or both of the first sensor 303A or the second sensor 303B may identify a pedestrian or another object in a crosswalk. The first sensor 303A and the second sensor 303B are not limited to vision sensors as other types of sensors, such as, for example, light detection and ranging (LiDAR), a radio detection and ranging (radar), sonar, and/or lasers are also contemplated for either of the sensors 303A, 303B. The measurements of the first sensor 303A and the second sensor 303B may be processed by one or more of the processor 320, the sensor module 302, the communication module 322, the location module 318, the locomotion module 323, the planning module 324, in conjunction with the computer-readable medium 313 to implement the functionality described herein. In one configuration, the data captured by the first sensor 303A and the second sensor 303B may be transmitted to an external device via the transceiver 314. The first sensor 303A and the second sensor 303B may be coupled to the vehicle 100 or may be in communication with the vehicle 100.

Additionally, the sensor module 302 may configure the processor 320 to obtain or receive information from the one or more sensors 303A and 303B. The information may be in the form of one or more two-dimensional (2D) image(s) and may be stored in the computer-readable medium 313 as sensor data. In the case of 2D, the 2D image is, for example, an image from the one or more sensors 303A and 303B that encompasses a field-of-view about the vehicle 100 of at least a portion of the surrounding environment, sometimes referred to as a scene. That is, the image is, in one approach, generally limited to a subregion of the surrounding environment. As such, the image may be of a forward-facing (e.g., the direction of travel) 30, 90, 120-degree field-of-view (FOV), a rear/side facing FOV, or some other subregion as defined by the characteristics of the one or more sensors 303A and 303B. In further aspects, the one or more sensors 303A and 303B may be an array of two or more cameras that capture multiple images of the surrounding environment and stitch the images together to form a comprehensive 330-degree view of the surrounding environment. In other examples, the one or more images may be paired stereoscopic images captured from the one or more sensors 303A and 303B having stereoscopic capabilities.

The location module 318 may be used to determine a location of the vehicle 100. For example, the location module 318 may use a global positioning system (GPS) to determine the location of the vehicle 100. The communication module 322 may be used to facilitate communications via the transceiver 314. For example, the communication module 322 may be configured to provide communication capabilities via different wireless protocols, such as, but not limited to, Wi-Fi, long term evolution (LTE), 3G, 4G, 5G, 6G, etc. The communication module 322 may also be used to communicate with other components of the vehicle 100 that are not modules of the vehicle control system 300. Additionally, or alternatively, the communication module 322 may be used to communicate with an occupant of the vehicle 100. Such communications may be facilitated via audio feedback from an audio system of the vehicle 100, visual feedback via a visual feedback system of the vehicle, and/or haptic feedback via a haptic feedback system of the vehicle.

The locomotion module 323 may be used to facilitate locomotion of the vehicle 100. As an example, the locomotion module 323 may control movement of the wheels. As another example, the locomotion module 323 may be in communication with a power source of the vehicle 100, such as an engine or batteries. Of course, aspects of the present disclosure are not limited to providing locomotion via wheels and are contemplated for other types of components for providing locomotion, such as propellers, treads, fins, and/or jet engines.

The vehicle control system 300 also includes the planning module 324 for planning a route or controlling the locomotion of the vehicle 100, via the locomotion module 323. In one configuration, the planning module 324 overrides the user input when the user input is expected (e.g., predicted) to cause a collision. The modules may be software modules running in the processor 320, resident/stored in the computer-readable medium 313, one or more hardware modules coupled to the processor 320, or some combination thereof.

The motion estimation system 390 may be in communication with the sensor module 302, the transceiver 314, the processor 320, the communication module 322, the location module 318, the locomotion module 323, the planning module 324, and the computer-readable medium 313. In some examples, the motion estimation system 390 may be implemented as a machine learning model, such as a MoTok framework 400 as described with reference to FIG. 4. Working in conjunction with one or more of the sensors 303A, 303B, the sensor module 302, and/or one or more other modules 313, 314, 318, 320, 322, 323, 324, the motion estimation system 390 may perform one or more elements of the process 500 described with reference to FIG. 5.

As discussed, object segmentation (e.g., instance segmentation, hereinafter used interchangeably) refers to the task of separating objects from a background. Some conventional object segmentation systems use appearance-based perceptual grouping to parse a scene into object-like regions. Recent research in this area has focused on unsupervised object-centric representation learning, with a wide variety of learning-based methods introduced using an encoder-decoder architecture. These methods aim to learn compositional feature representations, such as a set of variables that can bind to objects in an image or a video. Some conventional object segmentation systems bind a set of variables (e.g., slots) to image locations, which are then decoded individually and combined to reconstruct the image. Such conventional object segmentation systems focused on using appearance-based perceptual grouping to separate objects from the background. These conventional object segmentation systems often rely on low-level cues such as color and struggle to generalize to complex backgrounds. To address this limitation, some other conventional object segmentation systems extend the slot concept to videos by reconstructing in the optical flow or depth space, and use motion cues to guide the slots to find moving objects. Some other conventional object segmentation systems leverage 3D geometry as inductive biases to enforce the learning-based models' focus on object-like regions.

Various aspects of the present disclosure are directed to training an object segmentation system, in an unsupervised manner, to learn object-centric representations. In some examples, the object segmentation system learns object-centric representations by leveraging motion-guidance and mid-level feature tokenization. By using motion-guidance and mid-level feature tokenization, aspects of the present disclosure enable the emergence of interpretable object-specific mid-level features, which are features that capture higher-level semantic information about the objects in the scene.

In some examples, the object segmentation system includes an auto-encoder representation learning framework with two key components: motion-guidance and mid-level feature tokenization. Motion-guidance refers to the use of motion cues to guide the learning process, allowing the object segmentation system to identify and track objects in the scene without explicit labeling. Mid-level feature tokenization refers to the use of vector quantization to extract and represent object-specific mid-level features, which are more abstract and semantically meaningful than low-level features. Such examples leverage the synergy between motion and tokenization, improving upon the conventional object segmentation systems that are trained on synthetic and/or real datasets.

In some examples, the object segmentation system may use a motion-guided token (MoTok) framework. The MoTok framework is an example of a unified framework for unsupervised video object segmentation. The MoTok framework may be based on a combination of motion and discretization. In some examples, objects may be defined as discrete entities that may have independent motion.

To guide the tokenization process, the MoTok framework leverages motion cues to enable unsupervised motion-guided tokenization. Tokenization is a vector quantization process that uses attention mechanisms in transformer architectures. By leveraging motion to guide tokenization, the MoTok framework improves the efficiency and interpretability of the object discovery process. Additionally, with sufficient capacity in the decoder, motion guidance alleviates the need for labels, optical flow, or depth decoding, and improves upon the conventional object segmentation systems in both real and synthetic datasets. In some examples, the MoTok framework also maps motion-guided tokens to interpretable mid-level features, which are distinguishable from conventional clusters of low-level features. By mapping motion-guided tokens to interpretable mid-level features, the MoTok framework may scale to realistic videos. Tokens refer to discrete, quantized representations of the mid-level features extracted from a set of feature maps. These tokens are obtained through a vector quantization process using a vector quantized-variational auto encoder (VQ-VAE) that learns a latent embedding space of quantized feature vectors.

Figure 4:
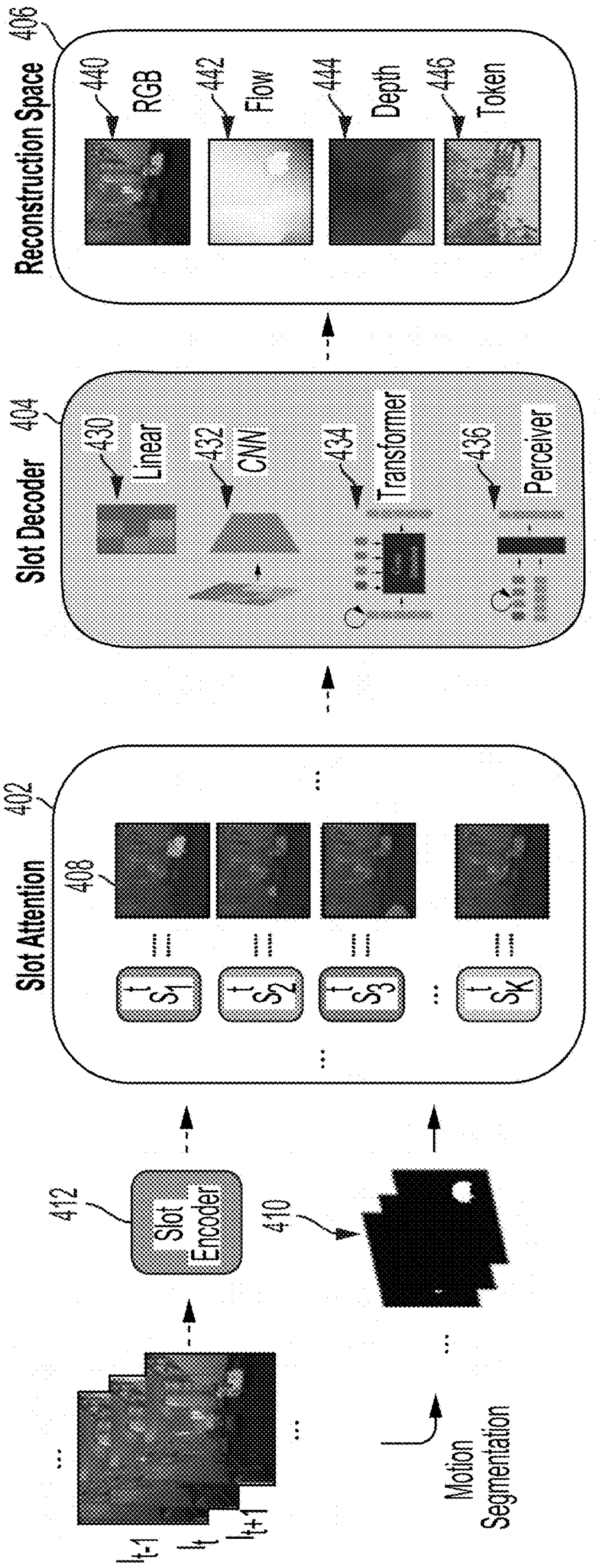
FIG. 4 is a block diagram illustrating an example of a motion-guided token (MoTok) framework, in accordance with various aspects of the present disclosure.

FIG. 4 is a block diagram illustrating an example of a MoTok framework 400, in accordance with various aspects of the present disclosure. The MoTok framework 400 (hereinafter also referred to as the model 400) may be an example of a machine learning model, such as the motion estimation system 390 of FIG. 3. As shown in the example of FIG. 4, the MoTok framework 400 includes a motion-guided slot learning stage 402, a slot decoder 404, and a reconstruction space 406. In some examples, the slot decoder 404 is a perceiver decoder, and the reconstruction space 406 is a vector-quantized reconstruction space that is based on a token.

The MoTok framework 400 leverages the synergy between motion and tokenization, and enables the use of interpretable object-specific mid-level features. The first stage of the MoTok framework 400 is the motion-guided slot learning stage 402. In some examples, the motion-guided slot learning stage 402 uses a single attention operation to compute a slot state for each frame $I^T$ in a sequence of frames $\{I^1, I^2, \ldots, I^T\}$. Attention masks 408 may be supervised with motion segmentation masks 410 to guide the slots to find moving objects. For brevity, only one attention mask 408 is labeled in the example of FIG. 4. In some examples, sparse, instance-level motion segmentation masks 410 may be provided with every sequence of frames, and a bipartite matching is found between the attention masks 408 and the motion segment masks 410.

As shown in the example of FIG. 4, given a sequence of video frames $\{I^1, I^2, \ldots, I^T\}$, the framework 400 first process each frame through a slot encoder 412 to obtain an individual frame representation $H^t=f_{enc}(I^t)$. The slot encoder 412 may be an example of an encoder convolutional neural network. In some examples, the slot encoder 412 may extract features from the input frame $I^t$ to obtain the individual frame representation $H^t$. The individual frame representation $H^t$ may be a vector that captures the salient information of the frame and is used as input to the attention operation that computes the slot state $S^t$. The slot encoder 412 may be selected from a variety of available architectures, and the specific choice of slot encoder 412 may be based on the requirements of the object segmentation task.

The individual frame representations $H^t$ may be aggregated by a convolutional gated-recurrent-unit recurrent network (ConvGRU) spatiotemporal memory module to obtain a video encoding $H'^t$. Specifically, $H'^t=\text{ConvGRU}(R^{t-1},H^t)$, where $R^{t-1}\in\mathbb{R}^{H'\times W'\times D_{inp}}$ represents a recurrent memory state. $R^{t-1}$ represents a recurrent memory state at time step t-1. The recurrent memory state $R^{t-1}$ has a spatial resolution of $H'\times W'\times D_{inp}$, where H' represents a height, W' represents a width, and $D_{inp}$ represents a number of input feature maps to the ConvGRU. For ease of explanation, the ConvGRU spatiotemporal memory module may be referred to as the ConvGRU.

The ConvGRU is a type of recurrent neural network (RNN) that is designed for spatiotemporal modeling. Spatiotemporal modeling refers to modeling data that has both spatial and temporal dimensions, such as videos. The ConvGRU is an extension of a GRU, the ConvGRU may be applied to convolutional feature maps instead of sequential data that is processed by the GRU.

In the context of the framework 400, the ConvGRU spatiotemporal memory module aggregates the individual frame representations $H^t$ obtained from the slot encoder 412 over time. This allows the framework 400 to capture temporal dependencies and track objects as they move and change over time. Specifically, the module takes as input the previous memory state $R^{t-1}$ and the current frame representation $H^t$ and outputs a video encoding $H'^t$. The encoding may be used for subsequent object discovery and segmentation.

A single attention operation may be performed to compute the slot state $S^t={W^t}^T v(H'^t)$, where the attention matrix $W^t$ is computed using the slot state in the previous frame $S^{t-1}$. The attention matrix $W^t$ is transposed and multiplied with the encoded frame representation $H'^t$ to obtain a weighted sum of the encoded features. The function v(.) denotes a non-linear activation function that is applied element-wise to the weighted sum. The resulting vector is the slot state $S^t$, which is a compact representation of the current frame that captures the features of the frame $I^t$ for object segmentation. For the first frame $I^1$, a learnable initial state $S^0$ is used. For each slot $$s_i^t,$$

the attention mask $$W^t_{:,i}$$

is obtained. The attention mask $$W^t_{:,i}$$

is a column of the attention matrix $W^t$ that corresponds to the i-th slot $$s_i^t.$$

A motion cue may be used to guide the slots to find moving objects. In some examples, during training, a set of sparse, instance-level motion segmentation masks $M=\{M^1, M^2, \ldots, M^T\}$ (shown as motion segment masks 410 in FIG. 4) may be provided with each sequence of frames $\{I^1, I^2, \ldots, I^T\}$, where $M^t=\{m_1, m_2, \ldots, m_{C^t}\}$ $C^t$ represents the number of moving objects that were successfully segmented in a frame t, and the variable $m_j$ represents binary mask, where $m_j \in \{0, 1\}^{H' \times W'}$. The binary mask $m_j$ has a same spatial size (H'×W') as the intermediate feature maps. In some examples, the binary mask $m_j$ indicates which pixels in the frame correspond to the j-th segmented object ($m_j=1$) and which do not ($m_j=0$). The attention masks $W^t \in \mathbb{R}^{N \times K}$ may be supervised with the motion segments, where N is the number of slots and K is the maximum number of objects that can be attended to in a single frame. Each motion segmentation mask $M^t$ may also be considered as a set of length K padded with Ø (no object) for slots that do not have a corresponding motion segment, such that the motion segmentation masks 410 match the attention masks 408. The variable K represents a number of slots or object representations in the framework 400. A bipartite match is found between the motion segmentation masks 410 ($M^t$) and the attention masks 408 ($W^t$) with the lowest cost:

$$\hat{\sigma} = \underset{\sigma}{\operatorname{argmin}} \sum_{i=1}^{K} \mathcal{L}_{seg}\left(m_i, W^t_{:,\sigma(i)}\right), \tag{3}$$

where the $\mathcal{L}_{seg}$ ( ) function determines a segmentation loss between the motion segment $m_i$ and the attention map $$W^t_{:,\sigma(i)}$$

of the slot σ(i) at frame t. In Equation 1, the attention masks $W^t$ are supervised with the motion segments $m_i$ to guide the slots to find moving objects in the video frames. The goal is to find a bipartite matching between the motion segmentation masks $M^t$ and the attention masks $W^t$ with the lowest cost. Once the assignment $\hat{\sigma}$ has been computed, the final motion supervision objective is defined to compute the loss for the matched slots. The final motion supervision objective is as follows:

$$\mathcal{L}_{motion} = \sum_{i=1}^{K} \mathbb{1}_{\{m_i \neq \emptyset\}} \mathcal{L}_{seg}\left(m_i, W^t_{:,\sigma(i)}\right) \tag{2}$$

where $\mathbb{1}_{\{m_i \neq \emptyset\}}$ denotes that the loss is only computed for the matched slots and $\mathcal{L}_{seg}$ is the binary cross entropy. Binary cross entropy is a loss function that may be used for binary classification problems, the binary cross entropy measures a dissimilarity between a predicted probability distribution and a true probability distribution. In Equation 2, $\hat{\sigma}(i)$ represents an index of a slot to which the motion segment $m_i$ is assigned in frame t. The index $\hat{\sigma}(i)$ may be obtained via a bipartite matching function, such as Equation 1, that finds the best matching between the motion segmentation masks 410 ($M^t$) and the attention masks 408 ($W^t$). More specifically, the index $\hat{\sigma}(i)$ is the index of the slot that minimizes the segmentation loss $\mathcal{L}_{seg}$ ($m_i$, $$\left(m_i, W^t_{:,\hat{\sigma}(i)}\right).$$

As shown in FIG. 4, the framework 400 may use a slot decoder 420 to map a slot representation ($S^t$,$W^t$) to a 2D feature map $F^t$ for a reconstruction space 422. Specifically, the slot decoder 420 first applies a linear transformation to the concatenation of the slot representation Stand the attention mask $W^t$ to obtain an intermediate feature map, which is then reshaped and passed through several convolutional layers to produce the final 2D feature map $F^t$. Different types of decoders may be used, such as a linear decoder 430, a CNN decoder 432, a transformer decoder 434, or a perceiver decoder 436.

In some examples, the linear decoder 430 may map slot features $S^t$ to their corresponding positions based on the attention mask $W^t$. For a given position x, the feature map $F^t$ is computed as the weighted sum of the slot features $S^t$, where the attention mask $W^t$ may be used as weighting coefficients.

$$F^t_{linear}(x)$$

is a function for determining the output feature map of the linear decoder at position x. The linear decoder 430 can be expressed as:

$$F^t_{linear}(x) = \frac{\sum_{i=1}^{K} s_i^t(x) W^t_{x,i}}{\sum_{i=1}^{K} W^t_{x,i}}. \tag{4}$$

In some other examples, a CNN decoder 432 may be used. In such examples, the CNN decoder 432 adds two convolutional layers to the 2D feature map formed by Equation 3. The output of the decoder is denoted as $$F^t_{CNN}$$

and may be obtained by passing the linearly decoded slots ($S^t$) through two convolutional layers. The weights of the convolutional layers are learned during training. The expression for the CNN decoder is given as:

$$F^t_{CNN} = CNN\left(\frac{\Sigma_{i=1}^{K} S_i^t W_{:,i}^t}{\Sigma_{i=1}^{K} W_{:,i}^t}\right). \tag{4}$$

In some examples, the transformer decoder 434 may be used. The transformer decoder 434 may decodes a feature by querying a slot representation $S^t$ with a 2D positional embedding through a transformer decoder. The slot representation $S^t$ may also be referred to as the slot feature. A positional embedding is a learned vector representation that encodes information about the position of an element in a sequence or, in this case, a 2D feature map. The positional embeddings help the model better capture spatial relationships and patterns in the data. The query $P \in \mathbb{R}^{L' \times d_p}$ is a learnable positional embedding with length L'=H'×W'. By concatenating the slot representation $S^t$ with the positional embedding P, the transformer decoder 434 may attend to the spatial relationships between different slots and generate a feature map $F^t$ that is specific to the input sequence. The output of the decoder is the 2D feature map $F^t$, which may be determined as follows:

$$F^t_{tf} = \text{Transformer}(P, S^t, S^t). \tag{5}$$

The transformer decoder 434 may consider global connections between slot features $S^t$ and the input query, resulting in a more powerful feature map compared to the linear decoders. However, the transformer decoder 434 applies self-attention to the input positional query, which is redundant because the positional embedding is learnable. Additionally, in some examples, the transformer decoder 434 may increase resource use, thereby limiting the scalability of the model 400. To address these limitations, some aspects of the present disclosure use the perceiver decoder 436.

The perceiver decoder 436 is an alternative to the transformer decoder 434. The perceiver decoder 436 may replace the self-attention mechanism in the transformer decoder 434 with a more efficient cross-attention mechanism. The cross-attention mechanism is applied to a set of learned latent codes, rather than the input positional query, to form a more powerful feature map. Additionally, the perceiver decoder applies a learnable Fourier feature mapping to the input query to allow the model to learn complex temporal patterns. This makes the perceiver decoder more computationally efficient and scalable, while still being able to capture long-range dependencies in the input sequence.

The perceiver decoder 436 may process arbitrary inputs and arbitrary outputs in a computationally efficient manner. In the framework 400, the perceiver decoder 436 is used to decode a slot representation $S^t$. In some examples, for the perceiver decoder 436, a self-attention layer is added to the slot representations obtained from the motion-guided slot learning step. The self-attention layer is followed by a cross-attention layer for the output and positional embedding queries. In the case of a vector-quantized space, an additional decoder is not needed. The perceiver decoder 436 generates a 2D feature map $F^t$ that is output to a reconstruction space. The resulting reconstruction captures the salient information of the video and is used for object discovery. Function 1 illustrates a perceiver function of the perceiver decoder 436.

| Function 1 |
| --- |
| Perceiver($S^t$, P) |
| $S^t \rightarrow \text{Norm}(S^t)$ |
| $\hat{S}^t = \text{Self Attention}(S^t) + S^t$ |
| $\hat{S}^t \rightarrow \text{Norm}(\hat{S}^t)$ |
| $\tilde{S}^t = \text{MLP}(\hat{S}^t) + \hat{S}^t$ |
| $\tilde{S}^t \rightarrow \text{Norm}(\tilde{S}^t)$ $P \rightarrow \text{Norm}(P)$ |
| $F^t_{Perceiver} = \text{Transformer}(P, \tilde{S}^t, \tilde{S}^t)$ |

As shown in Function 1, the perceiver function Perceiver( ) receives a slot representation $S^t$ and positional embedding P as input. The perceiver function then updates the slot representation $S^t$ by applying a normalization function to the slot representation $S^t$ ($S^t \rightarrow \text{Norm}(S^t)$). A self-attention operation may be applied to the normalized slot representation $S^t$. The output of the self-attention operation is summed with the normalized slot representation $S^t$ to generate an updated slot representation $\hat{S}^t$ ($\hat{S}^t = \text{SelfAttention}(S^t) + S^t$). This operation enables the model 400 to capture the relationships between the slots and their relevance to each other, allowing for a better understanding of the spatial relationships between objects in a sequence of frames.

In the example of Function 1, after determining the updated slot representation $\hat{S}^t$, the perceiver function normalizes the updated slot representation $\hat{S}^t$ ($\hat{S}^t \rightarrow \text{Norm}(\hat{S}^t)$). The normalized slot representation $\hat{S}^t$ may be passed through a through a multi-layer perceptron (MLP) to capture non-linear interactions between the slot features. A residual connection $\hat{S}^t$ is added to the output of the MLP to obtain another updated representation $\tilde{S}^t$ ($\tilde{S}^t = \text{MLP}(\hat{S}^t) + \hat{S}^t$). The updated representation $\tilde{S}^t$ may then be normalized ($\tilde{S}^t \rightarrow \text{Norm}(\tilde{S}^t)$). The positional embedding P may also be normalized ($P \rightarrow \text{Norm}(P)$). The final feature map $$F^t_{Perceiver}$$

may be obtained by applying a cross-attention operation between the normalized positional embedding P output and the updated (e.g., augmented) slot representations $$\tilde{S}^t\left(F^t_{Perceiver} = \text{Transformer}\left(P, \tilde{S}^t, \tilde{S}^t\right)\right)$$

This operation allows the decoder 436 to attend to relevant information in the slot representations $\tilde{S}^t$ based on the positional embedding P and produce a feature map $$F^t_{Perceiver}$$

suitable for the reconstruction space.

In some examples, the perceiver decoder 436 may refine the slot representations by exploiting the interactions between different slots. The self-attention layer and the MLP associated with the perceiver decoder 436 may be used to refine the slot representations and obtain a more meaningful representation for each slot. The self-attention layer may also allow for each slot to attend to the information in other slots, which can help to capture complex dependencies between objects in the video. Additionally, the cross-attention layer of the perceiver decoder 436 may be used to obtain a reconstruction of the video that captures the salient information for object segmentation. The 2D feature map $$F^t_{Perceiver}$$

obtained from the cross-attention layer is further decoded to a reconstruction space using a CNN-based decoder, except in the case of a vector-quantized space.

The framework 400 may use different reconstruction spaces for object segmentation, such as an RGB space 440, a flow space 442, a depth space 444, or a vector-quantized (VQ) space 446 (e.g., token space). The RGB space 440 may provide more information in comparison to the other spaces, however, the RGB space 440 is the most complex due to the object/background ambiguity. The flow space 442 and the depth space 444 are more structured and may improve grouping. However, the flow space 442 may fail to accurately capture non-moving objects. Furthermore, the depth space 444 may fail to distinguish between objects that are near each other.

To address these issues, the framework 400 may use the VQ space 446, which is an end-to-end trainable and structured reconstruction space that is also informative. The VQ space 446 may be referred to as a VQ variational autoencoder (VQ-VAE). In contrast to the RGB space 440, flow space 442, and depth space 444, which directly predict the reconstruction, a feature map $F^t$ is supervised to match the latent embedding space of the VQ-VAE 446. This may be achieved by computing the embeddings of the feature map $F^t$ using the VQ-VAE 446 and comparing embeddings with the embedding of the original frame. The objective is to minimize the L2 distance between the two embeddings. This approach allows the model 400 to learn a more disentangled representation of the video, which facilitates object discovery and segmentation.

In some examples, the VQ-VAE 446 may be defined as a latent embedding space S, which includes N vectors $e_i$ of dimension $d_{vq}$ ($S=\{e_i \in \mathbb{R}^{d_{vq}} | i=1, 2, \ldots, N\}$. In some examples, given an input image $I^t$, the VQ-VAE 446 processes the input image $I^t$ with an encoder to obtain an output $$z^t_e, \text{ where } z^t_e = \text{Encoder}_{vq}(I^t).$$

$$z^t_e$$

may also be referred to as a continuous latent representation. The discrete latent variables z may be calculated via a neared neighbor search among the discrete feature set S:

$$z^t_q(x) = e^t_k, \text{ where } k = \text{argmin}_j \|z^t_e(x) - e_j\|_2 \quad (6)$$

In Equation 6, the continuous representation may be mapped to a discrete latent variable $$z^t_q(x)$$

that represents the index of the closest vector $$e^t_k$$

in the discrete feature set S, where x is an arbitrary 2D position, and k represents an index of the closest vector $$e^t_k$$

in the discrete embedding space S that is nearest to the continuous latent representation $$z^t_e$$

obtained from the input image I't by the encoder network associated with the VQ-VAE 446. The quantized latent variable $$z^t_q(x)$$

may be passed to a decoder network to generate a reconstructed output image $\hat{I}^t$, where $$\hat{I}^t = \text{Decoder}_{vq}(z^t_q).$$

The use of a discrete latent variable allows the model 400 to learn more robust and compact representations of the input data, while the discrete feature set S provides a rich and structured codebook for efficient representation and synthesis of the input data.

An objective function of the VQ-VAE 446 may be defined as:

$$\mathcal{L}_{VQVAE} = \log P(I^t | z^t_q) + \|sg[z^t_e] - z^t_q\|_2 + \|sg[z^t_q] - z^t_e\|_2. \quad (7)$$

In Equation 7, sg represents a stop-gradient operation that prevents gradients from flowing through the quantization operation, $$P(I^t | z^t_q)$$

represents a likelihood of the input image $I^t$ given the quantized latent variable $$z^t_q,$$

the term $$\|sg[z^t_e] - z^t_q\|_2 + \|sg[z^t_q] - z^t_e\|_2$$

represents a commitment loss. The commitment loss encourages the encoder to produce a discrete latent code that is consistent with the continuous latent representation. The first term $$(\|sg[z_e^t]-z_q^t\|_2)$$

measures the distance between the continuous latent representation $$z_e^t$$

and its quantized version $$z_q^t,$$

while the second term $$(\|sg[z_q^t]-z_e^t\|_2)$$

measures the distance between the quantized latent variable $$z_q^t$$

and its continuous version $$z_e^t.$$

By minimizing the commitment loss, the encoder is encouraged to produce a latent code that is consistent with the discrete codebook. This may lead to a more structured and interpretable representation of the input data. The use of both continuous and quantized latent variables allows for a more flexible and expressive representation of the input data, enabling the model to capture both the global and local features of the input images while maintaining a compact and efficient codebook. Additionally, By maximizing the log-likelihood of the input data given the latent variable $$\log P(I^t \mid z_q^t),$$

the VQ-VAE 446 encourages the encoder to produce a more informative and discriminative latent representation that captures the salient features of the input data, while also promoting the generation of more accurate and realistic reconstructions of the input data.

The quantized feature map $e_i$ may be used as a target signal for the slot feature map $F^t$. The final objective of VQ-VAE 446 and the VQ reconstruction is defined as:

$$\mathcal{L}_{VQ}=\mathcal{L}_{VQVAE}+\|sg[F^t]-z_q^t\|_2+\|sg[z_q^t]-F^t\|_2. \quad (8)$$

In Equation 8, $$\|sg[F^t]-z_q^t\|_2$$

represents a squared Euclidean distance between the slot feature map $F^t$ and the quantized latent variable $$z_q^t$$

obtained from the input image $I^t$ by the encoder network.

$$\|sg[F^t]-z_q^t\|_2$$

serves as a regularization term that encourages the slot attention mechanism to focus on the most relevant parts of the input image, promoting the emergence of a more structured and interpretable representation of the input data.

Additionally, $$\|sg[z_q^t]-F^t\|_2$$

represents a squared Euclidean distance between a quantized latent variable $$z_q^t$$

and the slot feature map $$F^t.\|sg[z_q^t]-F^t\|_2$$

enables the VQ-VAE 446 to jointly optimize the token space through the output of the slot decoder, leveraging the motion signal learned from the input data. By promoting the alignment between the quantized latent variable $$z_q^t$$

and the slot feature map $F^t$, $$\|sg[z_q^t]-F^t\|_2$$

encourages the model 400 to learn a more interpretable and structured token representation that captures the object-specific mid-level features of the input images, while also enhancing the temporal consistency of the reconstructed images. Furthermore, by reconstructing the input images in a more compact token space, the model 400 improve the utilization of the motion signal to achieve a more accurate and reliable slot representation, enhancing its ability to reason about dynamic and complex scenes. Overall, by integrating slot attention and vector quantization into a unified framework, the VQ-VAE 446 captures both the spatial and temporal features of high-dimensional data such as images, enabling the efficient and effective representation and reconstruction of such data while promoting the emergence of more interpretable and structured representations.

A goal of reconstructing in the VQ-space (e.g., VQ-VAE 446) is to reduce a dimensionality and variability of the data, such that the VQ-VAE 446 is more compact and less variable in comparison to the RGB space. To further structure and distinguish the latent vectors in the VQ-VAE 446, an additional contrastive constraint is added to the vector space. The contrastive constraint is expressed as:

$$\mathcal{L}_{contrastive} = \|\mathbb{1} - \text{softmax}(E \cdot E^t) \tag{9}$$

In Equation 9, $\mathbb{1}$ represents an identity matrix, and $E \in \mathbb{R}^{N \times d_{vq}}$ represents a matrix of the feature embedding space S. This constraint encourages each latent vector in the VQ-VAE 446 to be distinguishable from each other, promoting the emergence of a more structured and interpretable codebook. By incorporating this additional constraint, the VQ-VAE 446 is able to further improve the quality and efficiency of the representation and reconstruction of high-dimensional data such as images. It is worth noting that this constraint is an inductive constraint that facilitates the training of the VQ-VAE vector space and is agnostic to the specific model design. As such, inclusion of the constraint in the VQ-VAE 446 may be application specific.

In some examples, a final loss function for the model 400 is a combination of the reconstruction objective and the motion objective:

$$\mathcal{L} = \lambda \mathcal{L}_{motion} + \mathcal{L}_{recon},$$

where $\lambda$ represents a weighting factor. For the reconstruction loss $\mathcal{L}_{recon}$, $\mathcal{L}_{recon} = \mathcal{L}_{VQ}$ when performing reconstruction using the VQ-VAE 446. Otherwise, $\mathcal{L}_{recon}$ is an $L_2$ loss in the other three spaces (i.e., RGB, flow, and saliency). The L2 loss measures the squared Euclidean distance between the reconstructed image and the original input image. The motion objective $\mathcal{L}_{motion}$ is a motion supervision loss described in Equation 2.

Figure 5:
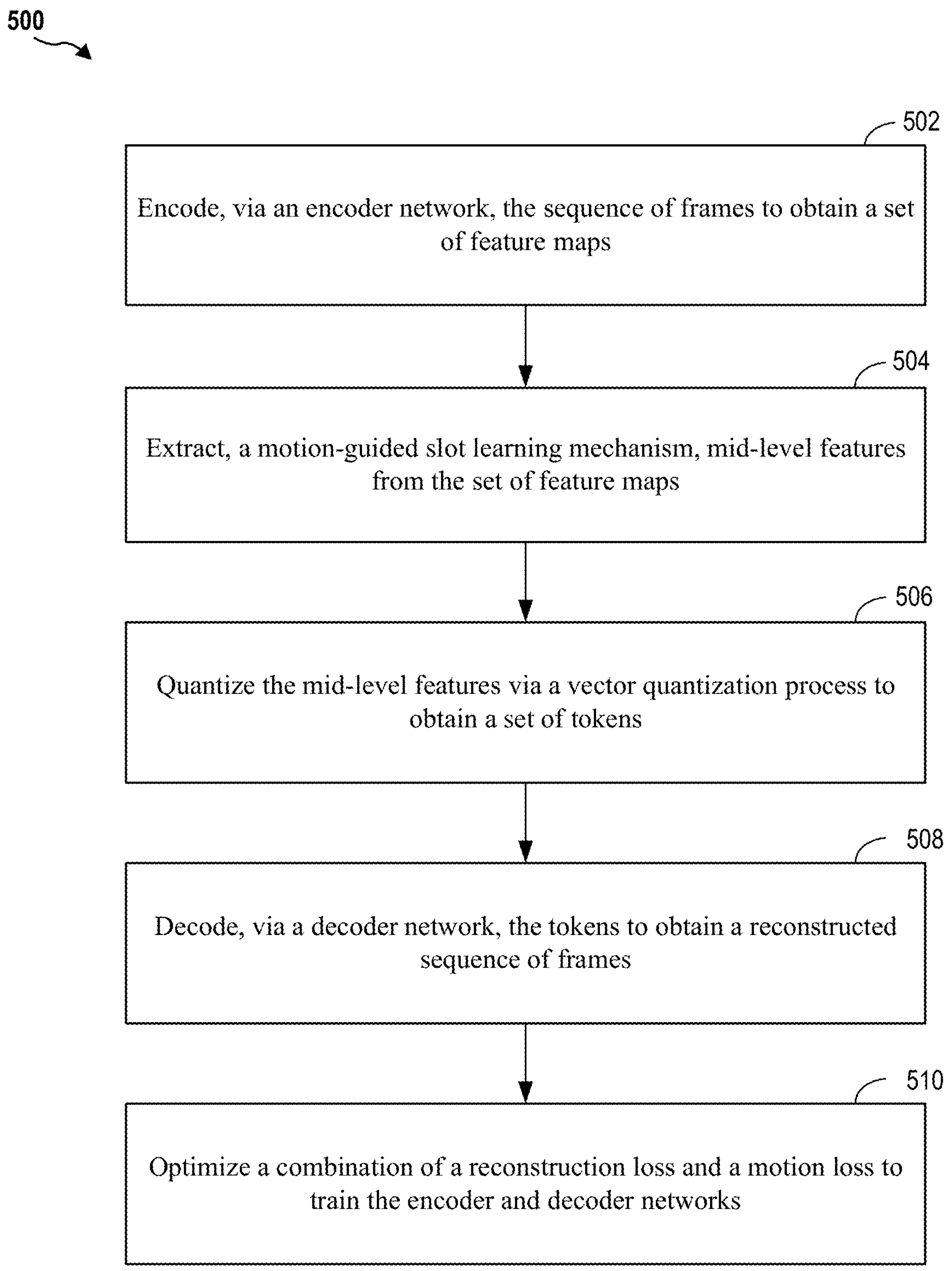
FIG. 5 is a flow diagram illustrating an example process performed in accordance with various aspects of the present disclosure.

FIG. 5 is a diagram illustrating an example process 500 performed in accordance with various aspects of the present disclosure. The process 500 may be performed by a vehicle, such as a vehicle 100 as described with reference to FIGS. 1A and 1B, and/or a depth estimation module of a vehicle, such as the motion estimation system 390 as described with reference to FIG. 3. The vehicle may be referred to as an agent. The example process 500 is an example of training an object segmentation system, in an unsupervised manner, to learn object-centric representations As shown in the example of FIG. 5, the process 500 begins at block 502 by encoding, via an encoder network, the sequence of frames to obtain a set of feature maps. At block 504, the process 500 extracts, a motion-guided slot learning mechanism, mid-level features from the set of feature maps. At block 506, the process 500 quantizes the mid-level features via a vector quantization process to obtain a set of tokens. At block 508, the process 500 decodes, via a decoder network, the tokens to obtain a reconstructed sequence of frames. At block 510, the process 500 optimizes a combination of a reconstruction loss and a motion loss to train the encoder and decoder networks.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for learning a representation of a sequence of frames, comprising:

encoding, via an encoder network, the sequence of frames to obtain a set of feature maps;

extracting, via a motion-guided slot learning mechanism, one or more sets of mid-level features from the set of feature maps in an unsupervised manner, each of the one or more sets of mid-level features corresponding to a respective moving object of one or more moving objects in the sequence of frames, each of the one or more moving objects being identified in accordance with a motion map;

quantizing the mid-level features via a vector quantization process to obtain a set of tokens;

decoding, via a decoder network, the tokens to obtain a reconstructed sequence of frames; and optimizing a combination of a reconstruction loss and a motion loss to train the encoder and decoder networks.

2. The method of claim 1, wherein:

the motion-guided slot learning mechanism determines the motion map from the sequence of frames; and the motion map guides the motion-guided slot learning process.

3. The method of claim 1, wherein:

the vector quantization process trains a Vector Quantized-Variational AutoEncoder (VQ-VAE) to learn a latent embedding space of quantized feature vectors, and the VQ-VAE quantizes the mid-level features.

4. The method of claim 1, wherein the decoder network includes a self-attention mechanism to learn temporal dependencies in the sequence of frames.

5. The method of claim 1, further comprising capturing the sequence of frames via one or more sensors associated with an agent.

6. The method of claim 5, further comprising controlling the agent to navigate through an environment based on training the encoder and decoder networks.

7. The method of claim 6, wherein the agent is an autonomous or semi-autonomous vehicle.

8. A non-transitory computer-readable medium having program code recorded thereon for learning a representation of a sequence of frames, the program code executed by a processor and comprising:

program code to encode, via an encoder network, the sequence of frames to obtain a set of feature maps;

program code to extract, via a motion-guided slot learning mechanism, one or more sets of mid-level features from the set of feature maps in an unsupervised manner, each of the one or more sets of mid-level features corresponding to a respective moving object of one or more moving objects in the sequence of frames, each of the one or more moving objects being identified in accordance with a motion map;

program code to quantize the mid-level features via a vector quantization process to obtain a set of tokens;

program code to decode, via a decoder network, the tokens to obtain a reconstructed sequence of frames; and program code to optimize a combination of a reconstruction loss and a motion loss to train the encoder and decoder networks.

9. The non-transitory computer-readable medium of claim 8, wherein:

the motion-guided slot learning mechanism determines the motion map from the sequence of frames; and the motion map guides the motion-guided slot learning process.

10. The non-transitory computer-readable medium of claim 8, wherein:

the vector quantization process trains a Vector Quantized-Variational AutoEncoder (VQ-VAE) to learn a latent embedding space of quantized feature vectors, and the VQ-VAE quantizes the mid-level features.

11. The non-transitory computer-readable medium of claim 8, wherein the decoder network includes a self-attention mechanism to learn temporal dependencies in the sequence of frames.

12. The non-transitory computer-readable medium of claim 8, wherein the program code further comprises program code to control an agent to navigate through an environment based on training the encoder and decoder networks.

13. The non-transitory computer-readable medium of claim 12, wherein the agent is an autonomous or semi-autonomous vehicle.

14. An apparatus for learning a representation of a sequence of frames, comprising:

at least one processor; and at least one memory coupled with the at least one processor and storing instructions operable, when executed by the at least one processor, to cause the apparatus to:

encode, via an encoder network, the sequence of frames to obtain a set of feature maps;

extract, via a motion-guided slot learning mechanism, one or more sets of mid-level features from the set of feature maps in an unsupervised manner, each of the one or more sets of mid-level features corresponding to a respective moving object of one or more moving objects in the sequence of frames, each of the one or more moving objects being identified in accordance with a motion map;

quantize the mid-level features via a vector quantization process to obtain a set of tokens;

decode, via a decoder network, the tokens to obtain a reconstructed sequence of frames; and optimize a combination of a reconstruction loss and a motion loss to train the encoder and decoder networks.

15. The apparatus of claim 14, wherein:

the motion-guided slot learning mechanism determines the motion map from the sequence of frames; and the motion map guides the motion-guided slot learning process.

16. The apparatus of claim 14, wherein:

the vector quantization process trains a Vector Quantized-Variational AutoEncoder (VQ-VAE) to learn a latent embedding space of quantized feature vectors, and the VQ-VAE quantizes the mid-level features.

17. The apparatus of claim 14, wherein the decoder network includes a self-attention mechanism to learn temporal dependencies in the sequence of frames.

18. The apparatus of claim 14, wherein execution of the instructions further cause the apparatus to capture the sequence of frames via one or more sensors associated with an agent.

19. The apparatus of claim 18, wherein execution of the instructions further cause the apparatus to control the agent to navigate through an environment based on training the encoder and decoder networks.

20. The apparatus of claim 19, wherein the agent is an autonomous or semi-autonomous vehicle.

* * * * *